350-96.27 SR

XR 3,360,670

SEARCH ROOM

Dec. 26, 1967 C. S. MANNING 3,360,670

FIBER OPTIC CATHODE RAY TUBE ASSEMBLY

SUBSTITUTE FOR MISSING XR

Filed Aug. 3, 1965

INVENTOR.
CHARLES S. MANNING
BY [signature]
[signature]
ATTORNEYS

United States Patent Office 3,360,670

Patented Dec. 26, 1967

3,360,670

FIBER OPTIC CATHODE RAY TUBE ASSEMBLY

Charles S. Manning, 3454 Bangor Place, San Diego, Calif. 92106

Filed Aug. 3, 1965, Ser. No. 477,048

8 Claims. (Cl. 313—64)

ABSTRACT OF THE DISCLOSURE

This disclosure relates to a cathode ray tube assembly employing fiber optics to superimpose a desired optical image upon the face of a cathode ray tube in addition to the normal optical display which is generated upon the face of the cathode ray tube under the control of a conventional cathode ray beam and its associated deflection and blanking means. The fiber optic arrangement employed in the cathode ray tube assembly extends from the exterior of the cathode ray tube to its interior. The fiber optics are arranged in separate sectors which are preferably grouped in a contiguous arrangement on the exterior of the tube to receive a projected optical image. The fiber optics sectors may be optically isolated at their contiguous points by suitable opaque material. Upon entering the interior of the tube, the sectors of the fiber optics arrangement separate to define divergent optical paths and are so arranged and supported with respect to suitable optical lens means as to project a full and complete composite picture on the face of the cathode ray tube without interfering or in any way impairing the usual visual display generated by the electron beam upon the face of the cathode ray tube. Accordingly, desired color combinations may be generated with a variety of range scales, grid reference lines, index markers, background displays or other related reference means to serve a useful purpose in adding to the totality of information and indications which may be visually displayed on the cathode ray tube assembly.

*Background of the invention*

The invention described herein may be manufactured and used by or for the Government of the United States of America for governmental purposes without the payment of any royalties thereon or therefor.

This invention relates to an improved cathode ray tube such as that used for radar display purposes and the like and more particularly to such a tube assembly which is especially adapted to project a desired optical image upon its face superimposed over the normal visual display caused by impingement of the electron beam on a luminescent coating.

In the use of cathode ray tubes for display and indicator purposes it is often desirable to project upon the face of the cathode ray tube one or more reference patterns, coded signals which may consist of particular shapes and/or color combinations, one or more of a variety of range scales, grid reference lines, index markers, background displays or other reference means which serve a useful purpose in relation to the information and indications visually displayed on the face of the cathode ray tube by reason of the impingement of an electron beam upon the face of the tube under the control of conventional cathode ray tube deflection and blanking means.

The prior art devices which sought to achieve superposition of additional reference or display patterns upon the face of cathode ray tubes have suffered from several disadvantages including relatively very complex optical systems, distortion of the optical image by reason of passage through the glass envelope of the cathode ray tube, loss and attenuation of the light energy sought to be transmitted for purposes of effecting the superimposed optical display, and the inability to transmit and superimpose multi-color displays upon the face of the cathode ray tube as well as other deficiencies.

The present invention contemplates the use of fiber optics techniques to communicate a selected optical image from the outside of a cathode ray tube to the interior of the cathode ray tube with the fiber optics arrangement being divided into a suitable number of sectors so that each sector may be appropriately positioned within the cathode ray tube proximate to appropriate optical means for projecting the sectors in a composite optical image display upon the face of the cathode ray tube.

In one form the present invention comprises a cathode ray tube which is adapted to receive input information for visual representation in response to the impingement of a controllable electron beam on the face of the tube which is internally coated with a luminescent material. The electron beam of the cathode ray tube may be controlled in deflection by suitable electromagnetic or electrostatic means and an appropriate arrangement for controlling the intensity and blanking the electron beam by bias or comparable suitable means. External to the cathode ray tube, a source of illumination and a suitable optical means are arranged to project an image of a selected display so as to impinge upon a fiber optics array which is supported within the body of a cathode ray tube at the focal plane of the external optical means. The fiber optics array extends from the outside of the cathode ray tube to the interior of the tube and is divided into a plurality of sectors. A plurality of optical means equal in number to the plurality of sectors is supported within the cathode ray tube in spaced disposition from its face and means are provided within the tube for supporting each fiber optics sector adjacent a respective optical means within the tube for projecting a composite illuminated display of the sectors on the face of the tube in superposition over the visual representation appearing on the face of the tube in response to the impingement of the controllable electron beam upon the luminescent coating of its face.

A principal object of the present invention is to provide a cathode ray tube assembly having a fiber optics arrangement which is adapted to receive a desired selective optical display for transfer to the interior of the tube and display in superposition on the face of the tube.

Another object of the present invention is to provide such a cathode ray tube assembly wherein the fiber optical arrangement is adapted to separate the selected optical display into a plurality of sectors which sectors are optically projected within the cathode ray tube to be combined on the face thereof in a composite display.

Yet another object of the present invention is to provide such a cathode ray tube assembly which is adapted to transmitting and projecting on the face thereof a selected multi-color display for superposition on the face thereof over the visual representation provided in response to the impingement of a controllable electron beam on the face of the tube.

A still further object of the present invention is to provide such a cathode ray tube assembly in which the arrangement of fiber optical means is adapted to minimize the distortion of the superimposed optical image on the face of the cathode ray tube.

These and other objects, advantages and features of the present invention will be more fully understood from the following description of several of its embodiments in conjunction with the accompanying drawings and its scope will be more particularly pointed out in the appended claims.

Figures 1, 2, 3:
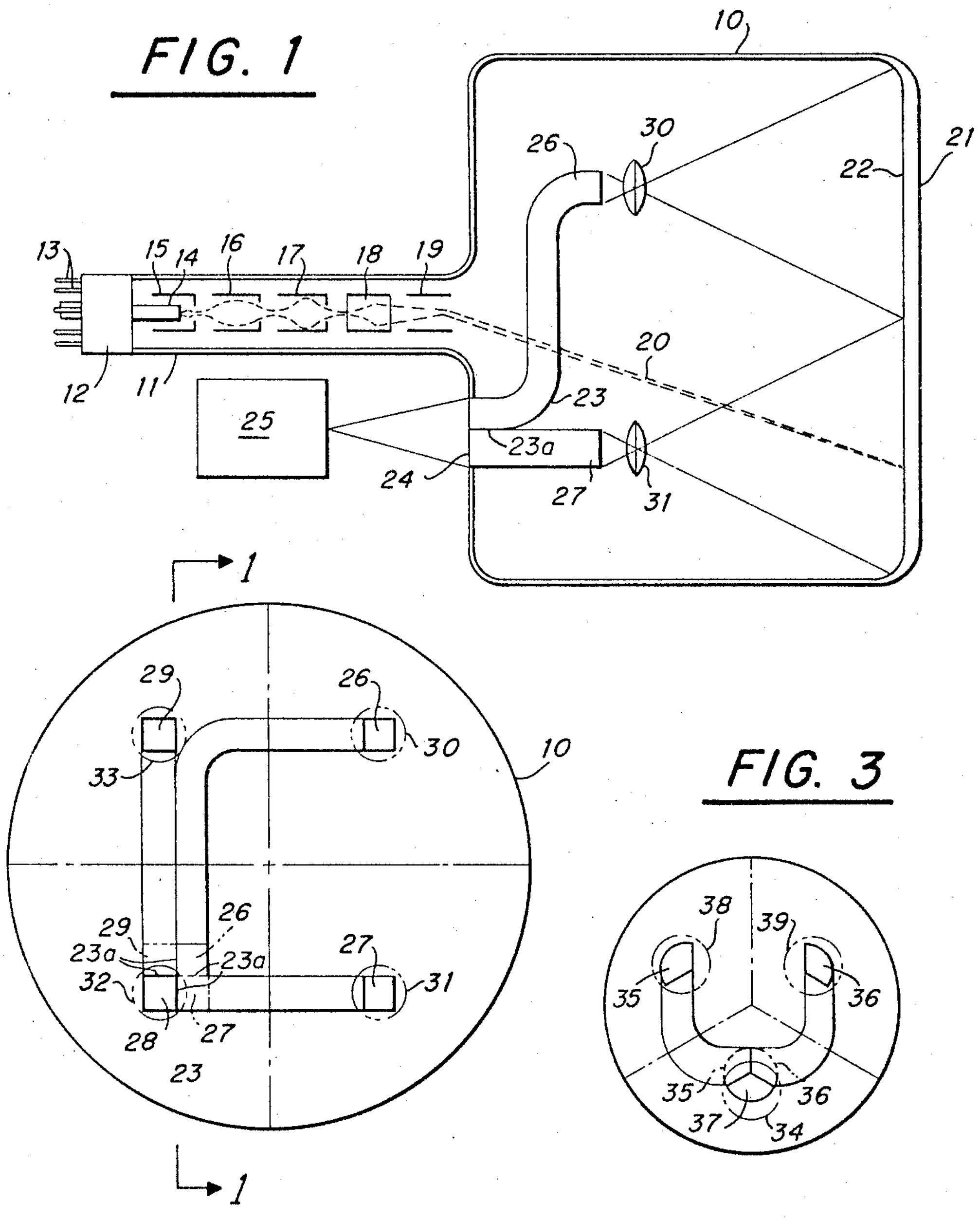
FIG. 1 is a sectional view of a cathode ray tube embodying the present invention.
FIG. 2 is a front end view of the cathode ray tube shown in FIG. 1.
FIG. 3 is a front end view of a variant embodiment of the present invention.

As may be seen from FIG. 1, the cathode ray tube of the present invention comprises an envelope 10 which may be of conventional glass construction and includes a neck portion 11 which is sealed to a socket connector 12. A plurality of connecting pins 13 provide electrical connection from without the cathode ray tube to its interior wherein a number of electrodes are enclosed in an electron gun arrangement. The cathode ray gun which develops the electron beam of the cathode ray tube may comprise a conventional cathode 14, a control grid 15, and a secondary grid 16. As indicated generally at 17, an appropriate arrangement for focusing the electron beam is provided and the beam passes from that point to two sets of electrostatic deflection plates 18 and 19 which provide controllable vertical and horizontal deflection, respectively, for the electron beam indicated schematically at 20. The cathode ray tube envelope 10 has a face as shown at 21, the interior of which is coated with a fluorescent material 22 so that when the electron beam impinges upon the fluorescent coating it is caused to luminesce and thereby produces a visual image on the face of the cathode ray tube.

It will be appreciated by those skilled in the art that the illustration of the embodiment of the present invention as shown in FIG. 1 is only one of several different types of cathode ray tubes which may be employed within the concept and spirit of the present invention. For instance, the deflection means need not be of the electrostatic type but may be of the electromagnetic type. These and other similar variations in embodiments of the present invention are outside its scope and it is to be understood that the concept of the present invention is not limited thereby. A fiber optics arrangement, shown generally at 23, is arranged to be supported within the wall of the cathode ray tube envelope 10 as shown at 24 so as to extend from the outside of the envelope 10 to the interior of the cathode ray tube. The fiber optics arrangement is supported within the cathode ray tube so as to have a cross-sectional portion thereof exposed to its exterior. The fiber optics arrangement may be cemented or secured to the envelope of the cathode ray tube by an appropriate sealing means, a number of which are well known in the art. An appropriate optical means such as the slide projector shown at 25 is positioned to project an image upon the cross-sectional fiber optic display 23. It will be noted that the fiber optics arrangement 23 is divided into a number of sectors, two of which are shown in the cross-sectional view of FIG. 1. One sector is disposed at 26 in the upper portion of the cathode ray tube and a second sector is disposed at 27 in a lower portion of the tube. The arrangement by which the sectors of the fiber optics array are disposed and arranged may, perhaps, be better seen from the illustration of FIG. 2.

In FIG. 2 the fiber optics arrangement 23 is seen to comprise four equal cross-sectional square sectors, 26, 27, 28 and 29, shown grouped together in contiguous disposition, at the point in which they are supported in the envelope 10 of the cathode ray tube to communicate from its outside to its interior. The contiguous portions of sectors 26, 27, 28, and 29 may include appropriately opaque means positioned at the lateral interface between contiguous fiber optic sectors as shown at **23*a* in FIGS. 1 and 2. The respective sectors 26, 27, 28 and 29 of the fiber optics arrangement 23 are arranged and supported within the envelope 10 of the cathode ray tube so as to be disposed at four equally spaced quadrant areas adjacent respective optical means such as the lens shown at 30, 31, 32 and 33, respectively. The selected optical display is focused upon the fiber optic arrangement at the point where it is supported in the wall or envelope 10** of the cathode ray tube and each sector portion is transmitted separately to one of a plurality of appropriate optical means which may take the form of four separate lenses as shown in FIGS. 1 and 2, for instance, so as to project each contiguous sector of the selected optical display in an enlarged image upon the face of the cathode ray tube to form a composite visual presentation which it is desired to superimpose upon the face of the cathode ray tube. The several optical means such as lenses may be supported within the envelope of the cathode ray tube by a wire structure or similar support means which extends in a suitable configuration from one interior wall of the envelope of the cathode ray tube to an opposing interior wall of the cathode ray tube, its basic requirement being that it is so configured and positioned as to not interfere with the full sweep of the electron beam generated by the cathode ray gun of the tube assembly. Such optical support means may in principle be basically the same general type as the support means customarily employed to position and support the electron gun and related assembly within the neck of a cathode ray tube in a well known manner. Thus, it may be seen, that a reference scale, an outline of related video data, azimuth, or other related reference can be superimposed upon the face of the cathode ray tube for use in connection with the information input data which is displayed on the face of the cathode ray tube in a conventional manner by control of the electron beam and its impingement upon the fluorescent coating on the interior on the face of the tube.

It will be seen from the embodiment illustrated in FIGS. 1 and 2 that the present invention is readily adaptable to quickly and effectively change such superimposed optical image as desired by merely changing the source of the optical image such as the slide used with the slide projector 25 exterior to the cathode ray tube. The illustration of FIG. 3 shows the manner in which the fiber optical display arrangement of the present invention may be divided sectorially in a different number of contiguous areas.

In the illustration of FIG. 3 the cathode ray tube is divided into three equally angular contiguous sectors which are disposed radially from the central axis of the cathode ray tube. Thus, it may be seen, that the fiber optic ararngement 34 is divided into three equal cross-sectional contiguous segments 35, 36 and 37 which are disposed at three equally spaced points disposed radially about the central axis of the cathode ray tube so as to be in proper alignment with optical means in the form of lens 38, 39 and 40, respectively. In the embodiment shown in FIG. 3 the reassembled composite enlarged optical image of the visual display that is selected for superimposition upon the face of the cathode ray tube will appear on the tube in the three sectors as shown schematically divided into three equilateral, triangular sectors indicated by the broken lines.

Further, it should be appreciated that the present invention is not limited in its concept or scope to any specific number of contiguous sectors but may be designed in embodiments in accordance with the particular needs and desires of a particular application. Thus, the present invention may comprise two contiguous sectors three, four or more as desired or necessary.

It should be appreciated that one of the highly desirable features of the present invention is that the unique concept of fiber optics employed to communicate from the exterior of the cathode ray tube to its interior minimizes the problem which was a deficiency of many prior art arrangements, i.e., that of distortion of the optical image or display it was sought to superimpose upon the face of the cathode ray tube. At the same time, the disposition of the fiber optics arrangement avoids interference with the electron gun and deflection means of the cathode ray tube and its conventional operation.

Additionally, the present invention has the highly desirable advantage that any multi-color optical image can be superimposed upon the face of the cathode ray tube as desired by the use of a multi-colored source such as a multi-colored slide employed in the slide projector shown in FIG. 1.

Inherent in the concept of the present invention is the fact that the conventional function of the electron gun, its deflection means, and intensity control of the cathode tube is not interfered with in any way and is not required to be changed or modified in any material way.

Moreover, the present invention may be adapted so that the optical image projected in superimposition upon the face of the cathode ray tube can be oriented by rotation or other movement as may be necessary or desirable to cooperatively coact with the input information which is caused to be visually displayed on the face of the cathode ray tube by impingement of the electron beam upon the fluorescent screen coating on the face of the tube. Thus, by rotating or sliding the original source of the optical image on the exterior of the cathode ray tube as in a slide projector, for instance, the superimposed image is caused to be rotated, oriented or shifted, as desired to properly perform its cooperative function with the other input information displayed on the face of the cathode ray tube. As will be apparent to those skilled in the art, a plurality of pre-selected optical images may be arranged as in an electrically actuated automatic slide changer so that the optical image which is superimposed on the interior of the face of the cathode ray tube may be remotely selected, changed and controlled as desired.

Obviously many modifications and variations of the present invention are possible in the light of the above teachings. It is therefore to be understood that within the scope of the appended claims the invention may be practiced otherwise than as specifically described.

What is claimed is:

1. A cathode ray tube assembly comprising a cathode ray tube adapted to receive input information for visual representation in response to the impingement of a controllable electron beam on a face of said cathode ray tube and means for superimposing a selectable illuminated display on the face of said cathode ray tube, said means comprising:

first optical means external to said cathode ray tube;

a source of illumination arranged to project an image of said selected display through said first optical means;

a fiber optics array supported by said cathode ray tube at the focal plane of said optical means and extending into the interior of said tube, said array being divided into a plurality of fiber optics sectors;

a plurality of second optical means equal in number to said sectors and supported within said cathode ray tube in spaced disposition from said face; and means supporting each said fiber optics sector adjacent a respective second optical means within said cathode ray tube for projecting a composite illuminated display from said fiber optics sectors onto the face of said tube.

2. A cathode ray tube assembly as claimed in claim 1 wherein said fiber optics sectors are substantially of the same cross-sectional area and configuration.

3. A cathode ray tube assembly as claimed in claim 1 and including an electron gun and electron beam deflection means centrally positioned within said cathode ray tube.

4. A cathode ray tube assembly as claimed in claim 1 wherein said fiber optics array comprises equally angular sectors for projecting a composite illuminated display divided into equiangular sectors radially disposed relative to substantially the center of said display.

5. A cathode ray tube assembly as claimed in claim 1 wherein said fiber optics sectors are four in number defining contiguous quadrants of the cross-sectional area of said fiber optics sectors.

6. A cathode ray tube assembly as claimed in claim 3 wherein said plurality of second optical means supported therewithin are radially disposed relative to said centrally positioned electron gun and electron beam deflection means.

7. A cathode ray tube assembly as claimed in claim 1 wherein said fiber optics array includes light insulating means between contiguous sectors thereof.

8. A cathode ray tube assembly as claimed in claim 1 wherein said fiber optics sectors are terminally supported in a common plane within said cathode ray tube.

References Cited

UNITED STATES PATENTS

| | | | |
|---|---|---|---|
| 2,873,396 | 2/1959 | Baldwin | 313—64 |
| 2,915,659 | 12/1959 | Goodman | 313—65 |
| 3,021,834 | 2/1962 | Sheldon | 350—96 X |

DAVID J. GALVIN, *Primary Examiner.*

JAMES W. LAWRENCE, *Examiner.*

P. C. DEMEO, *Assistant Examiner.*